US012680043B1

(12) United States Patent
Atkinson et al.

(10) Patent No.: US 12,680,043 B1
(45) Date of Patent: Jul. 14, 2026

(54) NUT SHELL SMOKE FLAVORING AND/OR COOKING COMPOSITIONS AND METHODS OF FABRICATION AND USE THEREOF

(71) Applicant: Atkinson Food Group LLC, Mansfield, LA (US)

(72) Inventors: Newell Atkinson, Mansfield, LA (US); Brianna Atkinson, Mansfield, LA (US); Bryan Atkinson, Mansfield, LA (US)

(73) Assignee: Atkinson Food Group LLC, Mansfield, LA (US)

( * ) Notice: Subject to any disclaimer, the term of this patent is extended or adjusted under 35 U.S.C. 154(b) by 195 days.

(21) Appl. No.: 18/137,276

(22) Filed: Apr. 20, 2023

(51) Int. Cl.
C10L 5/44 (2006.01)
C10L 5/36 (2006.01)
A23B 4/044 (2006.01)

(52) U.S. Cl.
CPC .............. C10L 5/445 (2013.01); C10L 5/363 (2013.01); A23B 4/044 (2013.01); *C10L 2200/0469* (2013.01); *C10L 2230/10* (2013.01)

(58) Field of Classification Search
CPC ......... A23B 4/044; C10L 5/445; C10L 5/363; C10L 2200/0469; C10L 2230/10
See application file for complete search history.

(56) References Cited

U.S. PATENT DOCUMENTS

| | | | |
|---|---|---|---|
| 5,427,805 A | 6/1995 | Crace | |
| 7,517,371 B2 | 4/2009 | Traeger et al. | |
| 7,811,339 B2 | 10/2010 | Werner | |
| 8,142,526 B2 | 3/2012 | Park et al. | |
| 8,328,884 B1 | 12/2012 | Traeger | |
| 8,343,399 B2 | 1/2013 | Behrmann et al. | |
| 8,585,785 B2 | 11/2013 | Brusletto et al. | |
| 11,375,724 B2 | 7/2022 | Spradlin et al. | |
| 2002/0078623 A1 | 6/2002 | Raddon | |
| 2004/0224067 A1 | 11/2004 | Burt | |
| 2007/0289204 A1 | 12/2007 | Kahlen | |
| 2009/0223119 A1 | 9/2009 | Brusletto et al. | |
| 2011/0119996 A1 | 5/2011 | Heimann et al. | |
| 2023/0157336 A1* | 5/2023 | Laux ..................... | A23C 20/02 426/44 |

* cited by examiner

*Primary Examiner* — Ishal V Vasisth

(74) *Attorney, Agent, or Firm* — R. Keith Harrison

(57) ABSTRACT

Nut shell smoke flavoring and/or cooking compositions suitable for imparting smoke flavoring to foods and/or cooking foods may include a final composition product comprising, consisting essentially of, or consisting of compressed nut shell particles derived from nut shells. The final composition product may comprise, consist essentially of, or consist of about 100% by weight or volume endogenous nut shell ingredients. Methods of fabricating nut shell smoke flavoring and/or cooking compositions are also disclosed.

8 Claims, 3 Drawing Sheets

100

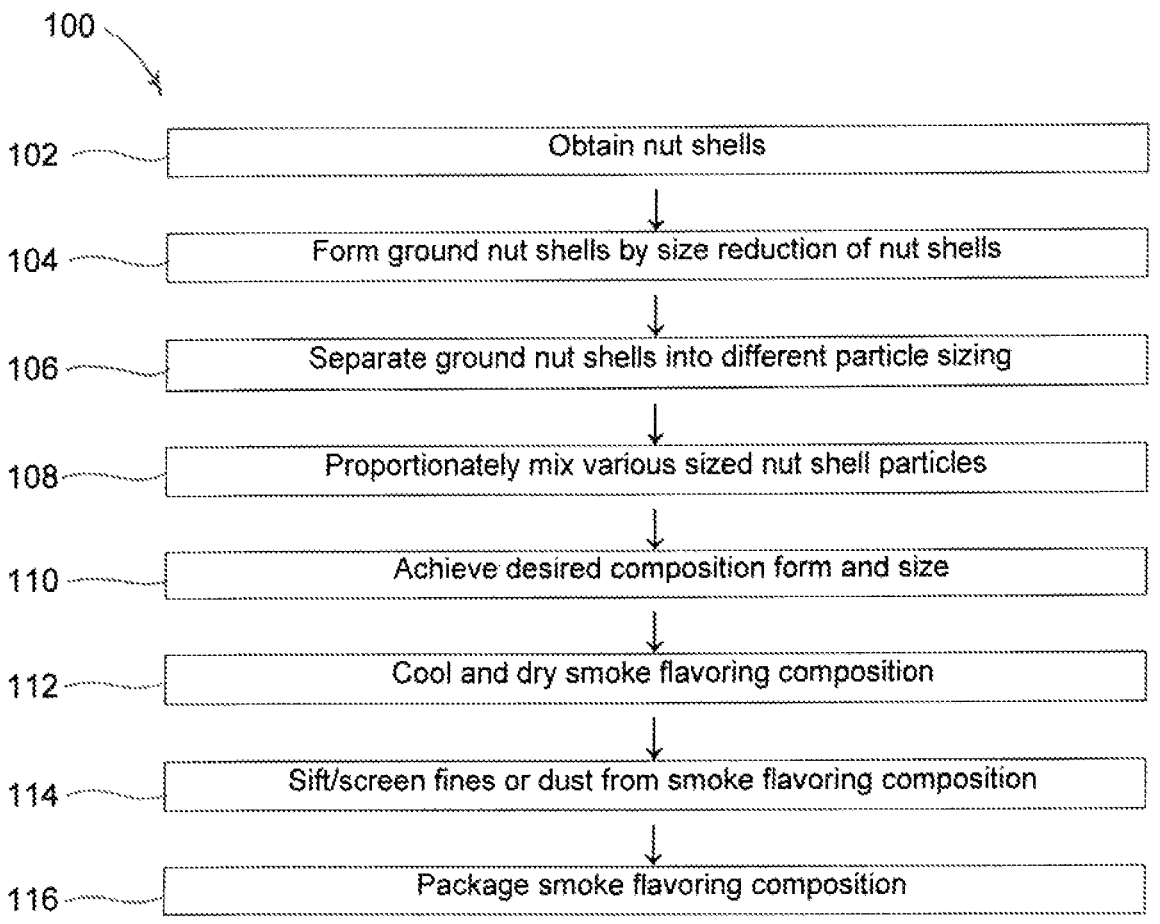

102 — Obtain nut shells

104 — Form ground nut shells by size reduction of nut shells

106 — Separate ground nut shells into different particle sizing

108 — Proportionately mix various sized nut shell particles

110 — Achieve desired composition form and size

112 — Cool and dry smoke flavoring composition

114 — Sift/screen fines or dust from smoke flavoring composition

116 — Package smoke flavoring composition

FIG. 1

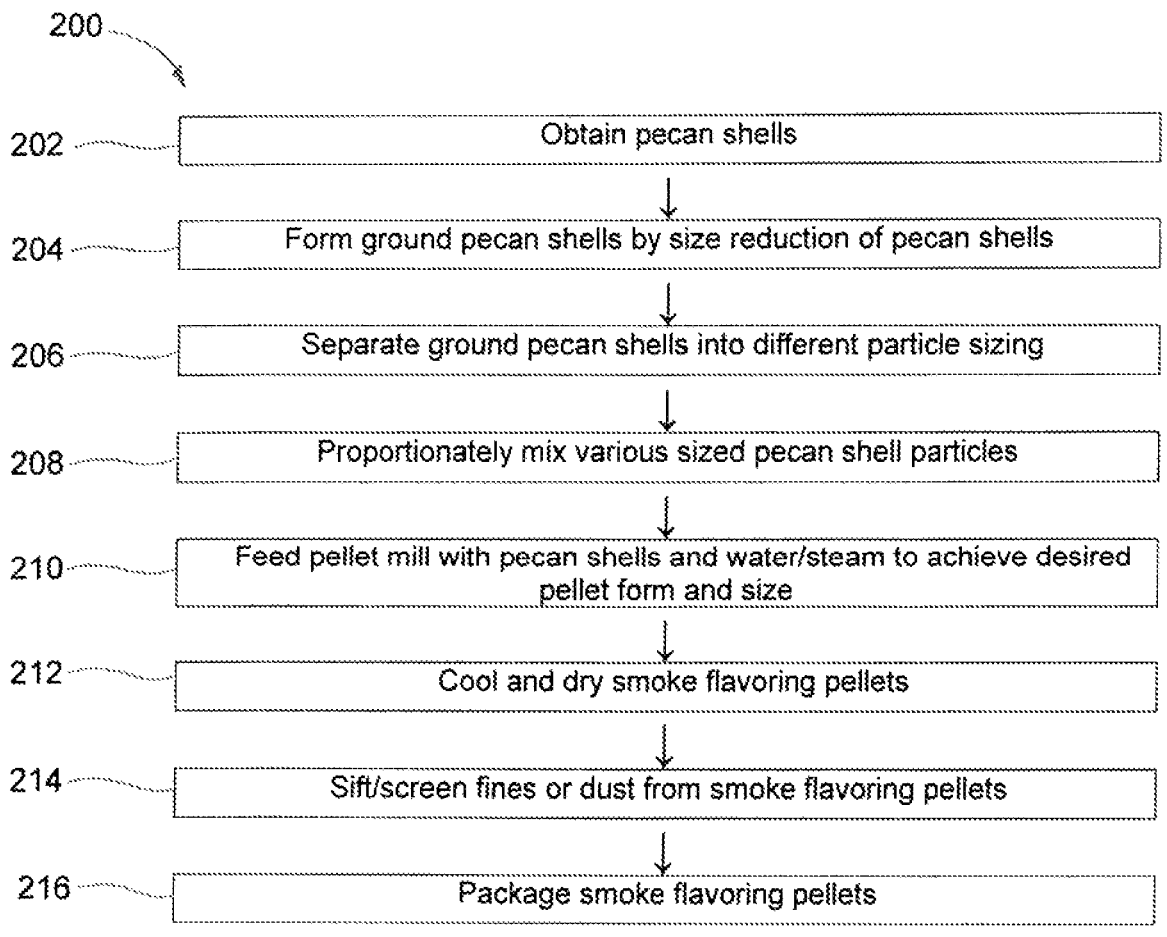

200

202 — Obtain pecan shells

204 — Form ground pecan shells by size reduction of pecan shells

206 — Separate ground pecan shells into different particle sizing

208 — Proportionately mix various sized pecan shell particles

210 — Feed pellet mill with pecan shells and water/steam to achieve desired pellet form and size 212 — Cool and dry smoke flavoring pellets 214 — Sift/screen fines or dust from smoke flavoring pellets 216 — Package smoke flavoring pellets

302 — Place smoke flavoring composition in food preparation apparatus

304 — Place food to be smoked in food preparation apparatus

306 — Ignite smoke flavoring composition

308 — Contact food to be smoked with smoke from smoke flavoring composition

310 — Remove smoked food from food preparation apparatus

312 — Serve/package/consume smoked food

NUT SHELL SMOKE FLAVORING AND/OR COOKING COMPOSITIONS AND METHODS OF FABRICATION AND USE THEREOF

FIELD

Illustrative embodiments of the disclosure generally relate to combustible smoke flavoring and/or cooking compositions suitable for imparting smoke flavoring to and/or cooking of foods. More particularly, illustrative embodiments of the disclosure relate to smoke flavoring and/or cooking compositions fabricated of nut shells and methods of fabrication and use thereof.

SUMMARY

Illustrative embodiments of the disclosure are generally directed to nut shell smoke flavoring and/or cooking compositions suitable for imparting smoke flavoring to foods and/or cooking foods and methods of fabrication and use thereof, An illustrative embodiment of the nut shell smoke flavoring and/or cooking compositions may include a final composition product which may comprise, consist essentially of, or consist of particles derived from nut shells. The final composition product may comprise, consist essentially of or consist of nut shells.

In some embodiments, the nut shell smoke flavoring and/or cooking composition may be prepared by obtaining nut shells; forming a nut shell particle mixture by grinding the nut shells; separating nut shells into different sizes; forming a mixture of particle sized nut shells; forming the nut shell smoke flavoring and/or cooking composition from the mixture; and forming a final composition product by cooling the nut shell smoke flavoring and/or cooking composition.

Illustrative embodiments of the disclosure are further directed to methods of fabricating a nut shell smoke flavoring and/or cooking composition. An illustrative embodiment of the methods may include obtaining nut shells; forming ground nut shells by grinding the nut shells; separating smaller particles from larger particles in the nut shell particle mixture; proportionately mixing the various sized pecan shell particles; achieving a desired composition form and size; forming the nut shell smoke flavoring and/or cooking composition from the pecan shell particle mixture; and forming a final composition product by cooling the nut shell smoke flavoring and/or cooking composition.

BRIEF DESCRIPTION OF THE DRAWINGS

Illustrative embodiments of the disclosure will now be described, by way of example, with reference to the accompanying drawings, in which:

FIG. 1 is a flow diagram of an illustrative method of fabricating a nut shell smoke flavoring and/or cooking composition;

FIG. 2 is a flow diagram of an illustrative method of fabricating pecan shell smoke flavoring and/or cooking pellets.

DETAILED DESCRIPTION

Figure 3:
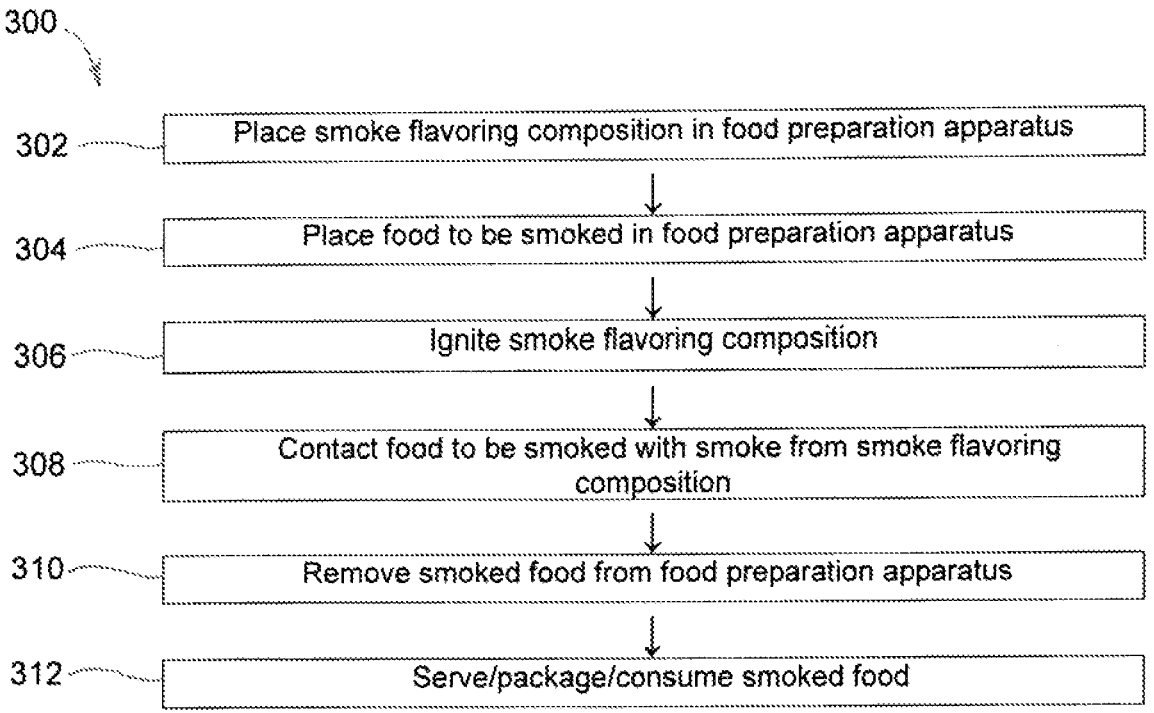
FIG. 3 is a flow diagram of an illustrative method of flavoring and/or cooking food using the nut shell smoke flavoring and/or cooking compositions.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to", Each embodiment disclosed herein can comprise, consist essentially of, or consist of its particular stated element, step, ingredient, or limitation. As used herein, the transition term "comprise" or "comprises" means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction. fruit Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Illustrative embodiments of the disclosure relate to nut shell smoke flavoring and/or cooking compositions comprising nut shells and/or materials or compositions made from nut shells. As used herein, the term "nut shell smoke flavoring and/or cooking composition" includes materials and/or compositions which are made in whole or in part from nut shells, and the smoke emanating from such materials and/or compositions impart flavoring and/or cooking to food when combusted. It will be recognized and understood that the nut shell smoke flavoring and/or cooking composition may, in some cases, provide heat which may promote cooking of the food. In some applications, the nut shell smoke flavoring and/or cooking compositions may be consumed in a pellet stove and/or other type of pellet heater for heating purposes.

As used herein, the term "nut shells" includes but is not limited to the shells of fruitwood tree nuts such as pecans, walnuts, pistachios, almonds, chestnuts, hickory nuts, and the like. In some embodiments, the nut shell smoke flavoring and/or cooking composition may include crushed shells of combinations of different kinds of fruitwood tree nuts. For example and without limitation, in some embodiments, the nut shells may be obtained from at least two different types of fruitwood tree nuts. In some embodiments, the nut shells may be obtained primarily from one kind of fruitwood tree nut, such as pecan primarily, and/or at least one other kind of fruitwood tree nut selected from a group consisting of walnuts, pistachios, almonds, chestnuts, and hickory nuts, and/or other kinds of nuts.

In some embodiments, the nut shell smoke flavoring and/or cooking composition may include crushed shells of one or more types of fruitwood tree nuts in combination with particles of wood obtained from trees which may include but are not limited to applewood trees, cherrywood trees, oak trees, and/or mesquite trees.

The nut shell smoke flavoring and/or cooking compositions may include a final composition product. The final composition product may comprise, consist essentially of or consist of compressed particles derived from nut shells. The final composition product may comprise, consist essentially of or consist of ground nut shells.

The nut shell smoke flavoring and/or cooking compositions set forth herein may be fabricated in any desired form. These forms may include but are not limited to pellets, logs, bricks, balls, blocks, briquettes, blanks, chips, patties, pucks, biscuits, and combinations thereof.

As used herein, "endogenous nut shell ingredients" are those ingredients or components which are sourced in, derived from, or intrinsic to the natural structure or substance of nut shells or the nut shells used to make the composition. As used herein, "exogenous ingredients" include all ingredients or components which are not sourced in, derived from, or intrinsic to the natural structure or substance of nut shells. Non-limiting examples of exogenous ingredients would include binders, oils, fillers, wood particles, sawdust, flavoring agents and the like. In some embodiments, up to and including 100% by weight or volume of the nut shell smoke flavoring and/or cooking composition may comprise, consist essential of, or consist of endogenous nut shell ingredients. Accordingly, the nut shell smoke flavoring and/or cooking composition may partially or completely lack or exclude exogenous ingredients which may otherwise be artificially added to the composition at any point during the fabrication process.

In some embodiments, up to and including 100% by weight or volume of the nut shell smoke flavoring and/or cooking composition may consist essentially of endogenous nut shell ingredients. Accordingly, the nut shell smoke flavoring and/or cooking composition may completely lack or exclude all exogenous ingredients which do not materially affect the composition.

In some embodiments, 100% by weight or volume of the nut shell smoke flavoring and/or cooking composition may consist of endogenous nut shell ingredients. Accordingly, the nut shell smoke flavoring and/or cooking composition may completely lack or exclude all exogenous ingredients.

Referring initially to FIG. 1 of the drawings, a flow diagram of an illustrative method of fabricating a nut shell smoke flavoring and/or cooking composition is generally indicated by reference numeral 100. At Step 102, nut shells may be obtained. The nut shells may include but are not limited to the shells of fruitwood tree nuts such as pecans, walnuts, pistachios, almonds, chestnuts, hickory nuts, and the like, and may include crushed shells of combinations of different kinds of fruitwood tree nuts. In some embodiments, the nut shells may include, consist essentially of, or consist of nut shells of a single type. For example and without limitation, in some embodiments, the nut shells may include, consist essentially of, or consist of pecan shells.

At Step 104, ground nut shells may be formed by size reduction of the nut shells obtained at Step 102. The size reduction of the nut shells may be performed using any type of shell crushing device and/or process which is suitable for the purpose. The nut shell particles may have any particle size which is compatible with the apparatus or equipment used to form the smoke flavoring and/or cooking composition. For example and without limitation, in some embodiments, the nut shell particles may have a particle size of from about 1½" (38.1 num) to about 0.0015" (0.37 mm) in diameter or width.

The nut shell particles may be obtained by subjecting the nut shells to milling, chopping, chipping, sawing, shredding or the like. The desired moisture content may be attained using drying techniques which are well-known in the art.

At Step 106, the ground nut shells obtained at Step 104 may be separated from each other according to different particle sizing. In some embodiments, this may be accomplished using a vibratory, circular and/or linear motion screening machine. The nut shell particle mixture which is obtained at Step 104 may be placed on a screen which separates the smaller particles from the larger particles in the mixture. The screen may be vibrated in a vibratory, circular and/or linear motion such that the particles in the mixture which are smaller than the mesh openings in the screen fall through the openings, whereas the larger particles in the mixture are retained by the screen. The mesh openings in the screen of the machine may have a mesh opening size of from about 0.0015" to about 2".

At Step 108, the various sized nut shell particles separated at Step 106 may be mixed in desired proportions to achieve the desired form for the smoke flavoring and/or cooking composition. For example and without limitation, in some embodiments, the nut shell particles having a width or diameter of from about 1" (25.4 mm) to about 0.0015" (37 mm) in diameter or width, or having a Tyler sieve size 400 or less, may be mixed. Small nut shell particles (particles having a Tyler mesh size of from about 80 to about 400) and large nut shell particles (particles having a Tyler mesh size of from about 2 to about 80) may be mixed in various proportions. For example and without limitation, in some embodiments, the large nut shell particles may be mixed with the small nut shell particles in a range of from about 1% to about 80% large nut shell particles by weight or volume. The small nut shell particles may be mixed with the large nut shell particles in a range of from about 1% to about 100% small nut shell particles by weight or volume. The nut shell particles may be mixed in a mixing chamber and/or other apparatus which is suitable for the purpose.

At Step 110, a desired form and size of a smoke flavoring and/or cooking composition may be achieved. This may be accomplished by forming the mixture obtained at Step 108 into pellets, logs, bricks, balls, blocks, briquettes, blanks, chips, patties, pucks, biscuits, and/or combinations thereof. Pelletization can be accomplished using any suitable pelletization technique known by those skilled in the art. In pelletization, the nut shell mixture may be agglomerated using mechanical and/or thermal processes. Pressure and heat may be applied to the particles in an extrusion process to form and obtain smoke flavoring and/or cooking pellets having a desired size and density. In some embodiments, each pellet may have a pellet size diameter or width of from about ⅛" to about 2" and may have a round, polygonal, oval and/or other cross-sectional shape.

In some embodiments, the pellets may be formed by forcing the pecan shell mixture obtained at Step 108 through a die and then allowing the resulting pellet to cool. Heat which results from the friction may melt the particles of different sizes and cause the nut shell particles to bind in the pellet during the subsequent cooling process. For example and without limitation, in some embodiments, the pellets may be formed by conveying or placing the mixture in a pellet mill. A supply of water may be placed in the pellet mill. The mixture may be fed into a hopper, and the water heated to form steam. Simultaneously, the mixture may be pressed in dies having the desired pellet configuration and shape. In some embodiments, the pellet mill may include a flat die press, a ring die press and/or a truncated cone roller press, for example and without limitation. The pellet mill may produce a pressure which may cause the temperature of the mixture to increase to a point within the range of from about 100° F. to about 450° F. In some embodiments, the pellet mill may exert an applied pressure of typically from about 8,000 pounds to about 40,000 pounds. Pressure may be applied for a time period of from typically about 0 min. to about 2 min., after which the pellets may be removed from the pellet mill for cooling.

In some embodiments, the pellets may be formed using an extrusion process, in which the mixture is fed into an apparatus having a helical surface attached to a rotating shaft inside a tube or cylinder. The mixture may then be formed through a tapered die at the end of the cylinder.

In fabrication of the smoke flavoring and/or cooking composition in the form of logs, bricks, balls, blocks, briquettes, blanks, chips, patties, pucks, biscuits or other form, a mold which defines the size and shape of the composition may be obtained. The mixture obtained at Step 108 may be placed in the mold, heated and pressed into the desired form at the same or similar temperatures, pressures and other parameters set forth above, using pressing equipment which is known by those skilled in the art and suitable for the purpose. In some embodiments, the composition form may be fabricated using extrusion or other techniques known by those skilled in the art.

At Step 112, the smoke flavoring and/or cooking composition formed at Step 110 may be cooled and dried to form a final composition product. The smoke flavoring and/or cooking composition may be cooled to a temperature of from about 220 degrees F. to about room temperature to form the final composition product. The final composition product may have an ending moisture of from about 2% to about 28%. In some embodiments, the moisture of the composition may be adjusted by spreading the composition over a rotating endless belt conveyor and directing air over the composition to adjust the temperature and moisture content accordingly. Additionally or alternatively, the composition may be cooled in a pellet cooling manifold, a stationary bin, a cooling transport elevator, a stack cooler, a counterflow cooler and/or on a cooling chain. The cooling process may be controlled such that cooling is even to ensure that the composition is durable.

At Step 114, fines or dust may be sifted, screened and/or otherwise removed from the smoke flavoring and/or cooking composition typically using a vibratory, circular and/or linear motion screening machine.

At Step 116, the final composition product may be packaged.

Referring next to FIG. 2 of the drawings, a flow diagram of an illustrative method of fabricating pecan shell smoke flavoring and/or cooking pellets is generally indicated by reference numeral 200. To the extent which is applicable, the method 200 may include the same equipment and processing parameters heretofore described with respect to the method 100 in FIG. 1. Accordingly, the description which was heretofore described with respect to the method 100 in FIG. 1 is hereby incorporated by reference herein in its entirety with respect to the method 200.

At Step 202, pecan shells may be obtained with an inbound moisture content of typically less than about 40%.

At Step 204, ground pecan shells may be formed by size reduction of the pecan shells obtained at Step 202. For example and without limitation, in some embodiments, the pecan shell particles may have a particle size of from about 1½" (38.1 mm) to about 0.0015" (0.37 mm) in diameter or width.

At Step 206, the ground pecan shells obtained at Step 204 may be separated from each other according to different particle sizing. In some embodiments, separation may be accomplished using a vibratory circular motion screening machine and/or rotating, circular and/or linear motion screening machine.

At Step 208, the various sized pecan shell particles separated at Step 206 may be mixed in the desired proportions. For example and without limitation, in some embodiments, the pecan shell particles having a width or diameter of from about 1" (25.4 mm) to about 0.0015" (37 mm), or having a Tyler sieve size 400 or greater, may be mixed. In some embodiments, the pecan shell mixture may comprise, consist essentially of or consist of ground pecan shells.

At Step 210, the pellet mill may be fed typically by belt, vibration mechanism, auger, and/or manually with the pecan shell particle mixture formed at Step 208 and with water/steam to achieve the desired pellet form and size. Pelletization may be accomplished as was heretofore described with respect to the method 100. In some embodiments, each pellet may have a pellet size diameter of from about ⅛" to about 2".

At Step 212, the smoke flavoring and/or cooking pellets may be cooled and dried to form a final pellet composition product. In some embodiments, the cooling process may take from about 4 minutes to about 48 hours depending typically on the size or mass and quantity of the smoke flavoring and/or cooking composition pellets. The final pellet composition product may have an ending moisture of from about 2% to about 28%. In some embodiments, the smoke flavoring and/or cooking pellets may comprise, consist essentially of or consist of 100% endogenous pecan shell ingredients by weight or volume.

At Step 214, fines or dust may be sifted, screened and/or otherwise removed from the smoke flavoring and/or cooking composition pellets typically by belt, vibration mechanism, auger, rotating sifter and/or manually, for example and without limitation.

At Step 216, the smoke flavoring and/or cooking pellets may be packaged.

Referring next to FIG. 3 of the drawings, a flow diagram of an illustrative method of flavoring and/or cooking food using the nut shell smoke flavoring and/or cooking compositions is generally indicated by reference numeral 300. At Step 302, the smoke flavoring and/or cooking composition may be placed in a food preparation apparatus. The food preparation apparatus may include any equipment which may be used to facilitate contact of food with smoke for flavoring and/or cooking purposes. In some embodiments, the food preparation apparatus may include an apparatus in which the smoke flavoring and/or cooking composition is burned or consumed. The apparatus may include an apparatus in which a cold smoking process, a hot smoking process, and/or a smoke roasting process can be carried out. For example and without limitation, in some embodiments, the food preparation apparatus may include a hot smoker, an offset smoker, a vertical smoker, a smoke box, a vertical water smoker, a propane smoker, or a smoke roaster such as an oven, grill, barbecue, barbecue pit, pellet smoking grill, smoker, stove, oven, fryer or the like.

In some embodiments, the food preparation apparatus may generally include an enclosure having a space or compartment which is configured to contain the smoke flavoring and/or cooking composition. A grill may overlie the space or compartment. The grill may be configured to support the food to be smoked over the space or compartment. The grill may have grill openings through which the smoke may rise from the combusting smoke flavoring and/or cooking composition into contact with the food. A lid or cover may be selectively deployable on the enclosure over the grill or other food preparation apparatus to retain the smoke within the enclosure and maintain contact between the smoke and the food for a selected time.

In some embodiments, the smoke flavoring and/or cooking composition may be the used as the only source of smoke which contacts the food in flavoring and/or cooking of the food. In other embodiments, the smoke flavoring and/or cooking composition may be used in combination with one or more additional smoke sources such as charcoal, for example and without limitation, in flavoring and/or cooking of the food.

At Step 304, the food which is to be smoked may be placed in the food preparation apparatus. The food may include meat such as seafood, poultry, pork, wild game, fruit and/or vegetables, for example and without limitation. In some embodiments, the food may be placed on a grill which overlies the space or compartment in which the smoke flavoring and/or cooking composition is placed. A lid or cover may be placed over the grill to enclose the food within the food preparation apparatus. In some applications, the food may be cooked in a hot smoker, an offset smoker, a vertical smoker, a smoke box, a vertical water smoker, a propane smoker, or a smoke roaster such as an oven, grill, barbecue, barbecue pit or pellet smoking grill, smoker, stove, oven or the like.

At Step 306, the smoke flavoring and/or cooking composition may be ignited. The ignition source may include an open flame or electrical heating coil, for example and without limitation. In some embodiments, a combustible solid or liquid fuel may be used to facilitate ignition of the smoke flavoring and/or cooking composition.

At Step 308, the food may be contacted with the smoke from the ignited smoke flavoring and/or cooking composition. In some embodiments, the smoke may rise from the smoke flavoring and/or cooking composition through openings in the grill on which the food is supported to flavor the food. The lid or cover of the food preparation may remain in place to maintain contact of the smoke with the food for a desired period of time to impart the desired smoke flavor to the food. Smoking and/or cooking of the food may be carried out from a few minutes to several hours or days.

At Step 310, the smoked food may be removed from the food preparation apparatus.

At Step 312, the smoked food may be served, packaged, or consumed.

It will be appreciated by those skilled in the art that the nut shell smoke flavoring and/or cooking compositions may be fabricated by partially or completely eliminating exogenous ingredients such as binders, fillers, oils, wood particles, sawdust and the like, thus eliminating the disagreeable or altered taste which may otherwise result by including those ingredients. The nut shell smoke flavoring and/or cooking compositions may be fabricated with up to 100% endogenous nut shell ingredients by weight or volume.

While certain illustrative embodiments of the disclosure have been described above, it will be recognized and understood that various modifications can be made to the embodiments and the appended claims are intended to cover all such modifications which may fall within the spirit and scope of the disclosure.

We claim:

1. A nut shell smoke flavoring or cooking composition consisting essentially of compressed nut shell particles derived from nut shells, wherein the composition product has about 100% by weight endogenous nut shell ingredients.

2. The nut shell smoke flavoring or cooking composition of claim 1 wherein the composition consists of 100% by weight endogenous nut shell ingredients.

3. The nut shell smoke flavoring or cooking composition of claim 1 wherein the composition is selected from the group consisting of pellets, logs, bricks, balls, blocks, briquettes, blanks, chips, patties, pucks, biscuits, or combinations thereof.

4. The nut shell smoke flavoring or cooking composition of claim 3 wherein the composition comprises pellets.

5. The nut shell smoke flavoring or cooking composition of claim 4 wherein each of the pellets has a round, oval or polygonal cross-sectional shape.

6. The nut shell smoke flavoring or cooking composition of claim 1 wherein the composition has a moisture content of from about 2% to about 28%.

7. The nut shell smoke flavoring or cooking composition of claim 1 wherein the composition consists essentially of 100% by weight endogenous pecan shell ingredients.

8. The nut shell smoke flavoring or cooking composition of claim 7 wherein the composition consists of 100% by weight endogenous pecan shell ingredients.

* * * * *